US009565479B2

(12) United States Patent
Shirali et al.

(10) Patent No.: US 9,565,479 B2
(45) Date of Patent: Feb. 7, 2017

(54) METHODS AND APPARATUS FOR SEEKING WITHIN A MEDIA STREAM USING SCENE DETECTION

(75) Inventors: Amey Shirali, Goa (IN); Satish Iyer, Bangalore (IN)

(73) Assignee: Sling Media PVT Ltd., Bangalore (IN)

( * ) Notice: Subject to any disclaimer, the term of this patent is extended or adjusted under 35 U.S.C. 154(b) by 923 days.

(21) Appl. No.: 12/538,784

(22) Filed: Aug. 10, 2009

(65) Prior Publication Data

US 2011/0035669 A1 Feb. 10, 2011

(51) Int. Cl.
*G06F 3/01* (2006.01)
*H04N 21/482* (2011.01)
*G06F 3/0481* (2013.01)
*G06F 3/0484* (2013.01)
*G11B 27/28* (2006.01)
*H04N 5/14* (2006.01)
*H04N 21/4227* (2011.01)
*H04N 21/432* (2011.01)
(Continued)

(52) U.S. Cl.
CPC ........ *H04N 21/482* (2013.01); *G06F 3/04817* (2013.01); *G06F 3/04847* (2013.01); *G11B 27/28* (2013.01); *H04N 5/147* (2013.01); *H04N 21/4227* (2013.01); *H04N 21/4325* (2013.01); *H04N 21/4347* (2013.01); *H04N 21/44008* (2013.01); *H04N 21/632* (2013.01); *H04N 21/8453* (2013.01); *H04N 21/8455* (2013.01)

(58) Field of Classification Search
CPC H04N 5/44543; H04N 21/4622; H04N 21/47; H04N 21/482; H04N 5/147; H04N 21/4227;H04N 21/4325; H04N 21/4347; H04N 21/44008; H04N 21/632; H04N 21/8453; H04N 21/8455; G11B 27/34; G11B 27/034; G11B 27/28; G06F 3/04817; G06F 3/04847
USPC .................................. 715/716; 709/231, 217
See application file for complete search history.

(56) References Cited

U.S. PATENT DOCUMENTS 3,416,043 A 12/1968 Jorgensen
4,254,303 A 3/1981 Takizawa
(Continued)

FOREIGN PATENT DOCUMENTS

CN 1464685 12/2003
DE 4407319 A1 9/1994
(Continued)

OTHER PUBLICATIONS

International Search Report and Written Opinion for International Application No. PCT/US2006/025911, mailed Jan. 3, 2007.

(Continued)

*Primary Examiner* — Jung-Mu Chuang
(74) *Attorney, Agent, or Firm* — LK Global

(57) ABSTRACT

A system uses generated scene transition frames to allow fast seeking within a media stream. A set of scene transition frames associated with the media stream are generated, then transmitted along with the media stream from a remotely located media source over a network. A subset of the scene transition frames are displayed, allowing a desired scene transition frame to be selected from a subset of the scene transition frames based on user input. The media source can then be displayed (e.g., played) starting from a frame corresponding to the desired scene transition frame.

10 Claims, 5 Drawing Sheets

(51) Int. Cl.
*H04N 21/434* (2011.01)
*H04N 21/44* (2011.01)
*H04N 21/63* (2011.01)
*H04N 21/845* (2011.01)

(56) References Cited

U.S. PATENT DOCUMENTS

| | | | |
|---|---|---|---|
| 5,161,021 A | 11/1992 | Tsai | |
| 5,206,929 A * | 4/1993 | Langford et al. | 715/723 |
| 5,237,648 A | 8/1993 | Mills et al. | |
| 5,386,493 A | 1/1995 | Degen et al. | |
| 5,434,590 A | 7/1995 | Dinwiddie, Jr. et al. | |
| 5,493,638 A | 2/1996 | Hooper et al. | |
| 5,590,262 A * | 12/1996 | Isadore-Barreca | 715/201 |
| 5,602,589 A | 2/1997 | Vishwanath et al. | |
| 5,635,982 A * | 6/1997 | Zhang | G06F 17/30802 348/231.99 |
| 5,661,516 A | 8/1997 | Carles | |
| 5,666,426 A | 9/1997 | Helms | |
| 5,682,195 A | 10/1997 | Hendricks et al. | |
| 5,706,290 A | 1/1998 | Shaw et al. | |
| 5,708,767 A * | 1/1998 | Yeo | G06F 17/30811 345/440 |
| 5,708,961 A | 1/1998 | Hylton et al. | |
| 5,710,605 A | 1/1998 | Nelson | |
| 5,717,879 A * | 2/1998 | Moran et al. | 715/716 |
| 5,722,041 A | 2/1998 | Freadman | |
| 5,757,416 A | 5/1998 | Birch et al. | |
| 5,774,170 A | 6/1998 | Hite et al. | |
| 5,778,077 A | 7/1998 | Davidson | |
| 5,794,116 A | 8/1998 | Matsuda et al. | |
| 5,821,945 A * | 10/1998 | Yeo | G06F 17/30825 345/440 |
| 5,822,537 A | 10/1998 | Katseff et al. | |
| 5,831,664 A | 11/1998 | Wharton et al. | |
| 5,850,482 A | 12/1998 | Meany et al. | |
| 5,852,437 A | 12/1998 | Wugofski et al. | |
| 5,880,721 A | 3/1999 | Yen | |
| 5,884,056 A * | 3/1999 | Steele | 715/738 |
| 5,898,679 A | 4/1999 | Brederveld et al. | |
| 5,909,518 A | 6/1999 | Chui | |
| 5,911,582 A | 6/1999 | Redford et al. | |
| 5,922,072 A | 7/1999 | Hutchinson et al. | |
| 5,936,968 A | 8/1999 | Lyons | |
| 5,968,132 A | 10/1999 | Tokunaga | |
| 5,987,501 A | 11/1999 | Hamilton et al. | |
| 6,002,450 A | 12/1999 | Darbee et al. | |
| 6,006,265 A * | 12/1999 | Rangan et al. | 709/226 |
| 6,008,777 A | 12/1999 | Yiu | |
| 6,014,694 A | 1/2000 | Aharoni et al. | |
| 6,020,880 A | 2/2000 | Naimpally | |
| 6,031,940 A | 2/2000 | Chui et al. | |
| 6,036,601 A | 3/2000 | Heckel | |
| 6,040,829 A | 3/2000 | Croy et al. | |
| 6,043,837 A | 3/2000 | Driscoll, Jr. et al. | |
| 6,049,671 A | 4/2000 | Slivka et al. | |
| 6,075,906 A | 6/2000 | Fenwick et al. | |
| 6,088,777 A | 7/2000 | Sorber | |
| 6,097,441 A | 8/2000 | Allport | |
| 6,104,334 A | 8/2000 | Allport | |
| 6,108,041 A | 8/2000 | Faroudja et al. | |
| 6,115,420 A | 9/2000 | Wang | |
| 6,117,126 A | 9/2000 | Appelbaum et al. | |
| 6,141,059 A | 10/2000 | Boyce et al. | |
| 6,141,447 A | 10/2000 | Linzer et al. | |
| 6,144,375 A * | 11/2000 | Jain et al. | 715/251 |
| 6,160,544 A | 12/2000 | Hayashi et al. | |
| 6,201,536 B1 | 3/2001 | Hendricks et al. | |
| 6,212,282 B1 | 4/2001 | Mershon | |
| 6,219,837 B1 * | 4/2001 | Yeo et al. | 725/38 |
| 6,222,885 B1 | 4/2001 | Chaddha et al. | |
| 6,223,211 B1 | 4/2001 | Hamilton et al. | |
| 6,240,459 B1 | 5/2001 | Roberts et al. | |
| 6,240,531 B1 | 5/2001 | Spilo et al. | |
| 6,243,596 B1 | 6/2001 | Kikinis | |
| 6,256,019 B1 | 7/2001 | Allport | |
| 6,263,503 B1 | 7/2001 | Margulis | |
| 6,278,446 B1 * | 8/2001 | Liou et al. | 715/700 |
| 6,279,029 B1 | 8/2001 | Sampat et al. | |
| 6,282,714 B1 | 8/2001 | Ghori et al. | |
| 6,286,142 B1 | 9/2001 | Ehreth | |
| 6,310,886 B1 | 10/2001 | Barton | |
| 6,340,994 B1 | 1/2002 | Margulis et al. | |
| 6,353,885 B1 | 3/2002 | Herzi et al. | |
| 6,356,945 B1 | 3/2002 | Shaw et al. | |
| 6,357,021 B1 | 3/2002 | Kitagawa et al. | |
| 6,370,688 B1 | 4/2002 | Hejna, Jr. | |
| 6,389,467 B1 | 5/2002 | Eyal | |
| 6,434,113 B1 | 8/2002 | Gubbi | |
| 6,442,067 B1 | 8/2002 | Chawla et al. | |
| 6,456,340 B1 | 9/2002 | Margulis | |
| 6,459,459 B1 * | 10/2002 | Ratakonda | G11B 27/28 348/700 |
| 6,466,623 B1 | 10/2002 | Youn et al. | |
| 6,466,732 B1 * | 10/2002 | Kimura et al. | 386/283 |
| 6,470,378 B1 | 10/2002 | Tracton et al. | |
| 6,476,826 B1 | 11/2002 | Plotkin et al. | |
| 6,487,319 B1 | 11/2002 | Chai | |
| 6,493,874 B2 | 12/2002 | Humpleman | |
| 6,496,122 B2 | 12/2002 | Sampsell | |
| 6,505,169 B1 | 1/2003 | Bhagavath et al. | |
| 6,510,177 B1 | 1/2003 | De Bonet et al. | |
| 6,514,207 B2 * | 2/2003 | Ebadollahi | G06T 7/0012 348/E5.112 |
| 6,529,506 B1 | 3/2003 | Yamamoto et al. | |
| 6,532,043 B1 * | 3/2003 | Kurtze et al. | 348/584 |
| 6,553,147 B2 | 4/2003 | Chai et al. | |
| 6,557,031 B1 | 4/2003 | Mimura et al. | |
| 6,560,281 B1 * | 5/2003 | Black | G06F 17/30793 345/158 |
| 6,564,004 B1 | 5/2003 | Kadono | |
| 6,567,984 B1 | 5/2003 | Allport | |
| 6,580,437 B1 * | 6/2003 | Liou et al. | 715/719 |
| 6,584,201 B1 | 6/2003 | Konstantinou et al. | |
| 6,584,559 B1 | 6/2003 | Huh et al. | |
| 6,597,375 B1 | 7/2003 | Yawitz | |
| 6,598,159 B1 | 7/2003 | McAlister et al. | |
| 6,600,838 B2 | 7/2003 | Chui | |
| 6,609,253 B1 | 8/2003 | Swix et al. | |
| 6,611,530 B1 | 8/2003 | Apostolopoulos | |
| 6,628,713 B1 * | 9/2003 | Kojima et al. | 375/240.16 |
| 6,628,716 B1 | 9/2003 | Tan et al. | |
| 6,642,939 B1 | 11/2003 | Vallone et al. | |
| 6,647,015 B2 | 11/2003 | Malkemes et al. | |
| 6,658,019 B1 | 12/2003 | Chen et al. | |
| 6,665,751 B1 | 12/2003 | Chen et al. | |
| 6,665,813 B1 | 12/2003 | Forsman et al. | |
| 6,678,635 B2 * | 1/2004 | Tovinkere et al. | 702/179 |
| 6,697,356 B1 | 2/2004 | Kretschmer et al. | |
| 6,701,380 B2 | 3/2004 | Schneider et al. | |
| 6,704,678 B2 | 3/2004 | Minke et al. | |
| 6,704,847 B1 | 3/2004 | Six et al. | |
| 6,708,231 B1 | 3/2004 | Kitagawa | |
| 6,718,551 B1 | 4/2004 | Swix et al. | |
| 6,721,361 B1 * | 4/2004 | Covell | G11B 27/031 348/594 |
| 6,738,100 B2 * | 5/2004 | Hampapur | H04N 5/147 348/699 |
| 6,754,266 B2 | 6/2004 | Bahl et al. | |
| 6,754,439 B1 | 6/2004 | Hensley et al. | |
| 6,757,851 B1 | 6/2004 | Park et al. | |
| 6,757,906 B1 | 6/2004 | Look et al. | |
| 6,766,376 B2 | 7/2004 | Price | |
| 6,768,775 B1 | 7/2004 | Wen et al. | |
| 6,771,828 B1 | 8/2004 | Malvar | |
| 6,774,912 B1 | 8/2004 | Ahmed et al. | |
| 6,781,601 B2 | 8/2004 | Cheung | |
| 6,785,700 B2 | 8/2004 | Masud et al. | |
| 6,795,638 B1 | 9/2004 | Skelley, Jr. | |
| 6,798,838 B1 | 9/2004 | Ngo | |
| 6,806,909 B1 | 10/2004 | Radha et al. | |
| 6,807,306 B1 * | 10/2004 | Girgensohn | G06F 17/30802 348/701 |
| 6,807,308 B2 | 10/2004 | Chui et al. | |

(56) References Cited

U.S. PATENT DOCUMENTS

| | | | |
|---|---|---|---|
| 6,816,194 B2 | 11/2004 | Zhang et al. | |
| 6,816,858 B1 | 11/2004 | Coden et al. | |
| 6,826,242 B2 | 11/2004 | Ojard et al. | |
| 6,834,123 B2 | 12/2004 | Acharya et al. | |
| 6,839,079 B2 | 1/2005 | Barlow et al. | |
| 6,847,468 B2 | 1/2005 | Ferriere | |
| 6,850,571 B2 | 2/2005 | Tardif | |
| 6,850,649 B1 | 2/2005 | Malvar | |
| 6,868,083 B2 | 3/2005 | Apostolopoulos et al. | |
| 6,889,385 B1 | 5/2005 | Rakib et al. | |
| 6,892,359 B1 | 5/2005 | Nason et al. | |
| 6,898,583 B1 | 5/2005 | Rising, III | |
| 6,907,602 B2 | 6/2005 | Tsai et al. | |
| 6,927,685 B2 | 8/2005 | Wathen | |
| 6,930,661 B2 | 8/2005 | Uchida et al. | |
| 6,941,575 B2 | 9/2005 | Allen | |
| 6,944,880 B1 | 9/2005 | Allen | |
| 6,952,595 B2 | 10/2005 | Ikedo et al. | |
| 6,965,723 B1* | 11/2005 | Abe et al. | 386/281 |
| 6,981,050 B1 | 12/2005 | Tobias et al. | |
| 6,985,623 B2* | 1/2006 | Prakash | H04N 5/147 |
| | | | 348/E5.067 |
| 7,016,337 B1 | 3/2006 | Wu et al. | |
| 7,020,892 B2 | 3/2006 | Levesque et al. | |
| 7,032,000 B2 | 4/2006 | Tripp | |
| 7,047,305 B1 | 5/2006 | Brooks et al. | |
| 7,089,496 B2* | 8/2006 | Hanes | 715/719 |
| 7,110,558 B1 | 9/2006 | Elliott | |
| 7,124,366 B2 | 10/2006 | Foreman et al. | |
| 7,151,575 B1 | 12/2006 | Landry et al. | |
| 7,155,734 B1 | 12/2006 | Shimomura et al. | |
| 7,155,735 B1 | 12/2006 | Ngo et al. | |
| 7,184,100 B1* | 2/2007 | Wilf | G11B 27/28 |
| | | | 348/700 |
| 7,184,433 B1 | 2/2007 | Oz | |
| 7,224,323 B2 | 5/2007 | Uchida et al. | |
| 7,239,800 B2 | 7/2007 | Bilbrey | |
| 7,313,183 B2* | 12/2007 | Bazin et al. | 375/240.01 |
| 7,344,084 B2 | 3/2008 | Dacosta | |
| 7,355,606 B2* | 4/2008 | Paquette | 345/589 |
| 7,406,249 B2* | 7/2008 | Shirakawa | G11B 20/1217 |
| | | | 386/241 |
| 7,430,686 B1 | 9/2008 | Wang et al. | |
| 7,436,886 B2* | 10/2008 | Hannuksela | 375/240.01 |
| 7,464,396 B2 | 12/2008 | Hejna, Jr. | |
| 7,502,733 B2 | 3/2009 | Andrsen et al. | |
| 7,505,480 B1 | 3/2009 | Zhang et al. | |
| 7,565,681 B2 | 7/2009 | Ngo et al. | |
| 7,634,793 B2* | 12/2009 | Hunleth et al. | 725/54 |
| 7,657,836 B2* | 2/2010 | Pan | G06F 17/30787 |
| | | | 715/719 |
| 7,725,912 B2* | 5/2010 | Margulis | 725/81 |
| 7,738,505 B2* | 6/2010 | Chang | 370/507 |
| 7,751,683 B1* | 7/2010 | Belknap | 386/278 |
| 7,804,503 B2* | 9/2010 | Fernandez et al. | 345/475 |
| 7,889,794 B2* | 2/2011 | Luo | G06F 17/30811 |
| | | | 348/700 |
| 7,941,031 B2* | 5/2011 | Tanikawa et al. | 386/241 |
| 8,032,840 B2* | 10/2011 | Haro et al. | 715/838 |
| 8,046,688 B2* | 10/2011 | Adams et al. | 715/723 |
| 8,050,321 B2* | 11/2011 | Hannuksela | 375/240.12 |
| 8,099,755 B2* | 1/2012 | Bajpai et al. | 725/94 |
| 8,237,720 B2* | 8/2012 | Li et al. | 345/473 |
| 8,237,864 B2* | 8/2012 | Chung | G11B 27/034 |
| | | | 348/578 |
| 8,363,960 B2* | 1/2013 | Petersohn | G06F 17/30802 |
| | | | 348/700 |
| 8,614,705 B2* | 12/2013 | Lefevre et al. | 345/419 |
| 8,629,918 B2* | 1/2014 | Takagi | 348/222.1 |
| 8,639,089 B2* | 1/2014 | Kusunoki et al. | 386/239 |
| 8,843,952 B2* | 9/2014 | Pora et al. | 725/18 |
| 2001/0021998 A1 | 9/2001 | Margulis | |
| 2002/0004839 A1 | 1/2002 | Wine et al. | |
| 2002/0010925 A1 | 1/2002 | Kikinis | |
| 2002/0012526 A1* | 1/2002 | Sai et al. | 386/69 |
| 2002/0012530 A1 | 1/2002 | Bruls | |
| 2002/0031333 A1 | 3/2002 | Mano et al. | |
| 2002/0046404 A1 | 4/2002 | Mizutani | |
| 2002/0053053 A1 | 5/2002 | Nagai et al. | |
| 2002/0080753 A1 | 6/2002 | Lee | |
| 2002/0090029 A1 | 7/2002 | Kim | |
| 2002/0105529 A1 | 8/2002 | Bowser et al. | |
| 2002/0112247 A1 | 8/2002 | Horner et al. | |
| 2002/0122137 A1 | 9/2002 | Chen et al. | |
| 2002/0131497 A1 | 9/2002 | Jang | |
| 2002/0138843 A1 | 9/2002 | Samaan et al. | |
| 2002/0143973 A1 | 10/2002 | Price | |
| 2002/0147634 A1 | 10/2002 | Jacoby et al. | |
| 2002/0147687 A1 | 10/2002 | Breiter et al. | |
| 2002/0167458 A1 | 11/2002 | Baudisch et al. | |
| 2002/0188818 A1 | 12/2002 | Nimura et al. | |
| 2002/0191575 A1 | 12/2002 | Kalavade et al. | |
| 2003/0001880 A1 | 1/2003 | Holtz et al. | |
| 2003/0014752 A1* | 1/2003 | Zaslavsky | H04N 21/4316 |
| | | | 725/40 |
| 2003/0028873 A1 | 2/2003 | Lemmons | |
| 2003/0065915 A1 | 4/2003 | Yu et al. | |
| 2003/0093260 A1 | 5/2003 | Dagtas et al. | |
| 2003/0095791 A1 | 5/2003 | Barton et al. | |
| 2003/0115167 A1 | 6/2003 | Sharif et al. | |
| 2003/0142751 A1* | 7/2003 | Hannuksela | 375/240.25 |
| 2003/0156552 A1* | 8/2003 | Banker et al. | 370/266 |
| 2003/0159143 A1 | 8/2003 | Chan | |
| 2003/0187657 A1 | 10/2003 | Erhart et al. | |
| 2003/0191776 A1* | 10/2003 | Obrador | G06F 17/30014 |
| 2003/0192054 A1 | 10/2003 | Birks et al. | |
| 2003/0208612 A1 | 11/2003 | Harris et al. | |
| 2003/0231621 A1 | 12/2003 | Gubbi et al. | |
| 2004/0003406 A1 | 1/2004 | Billmaier | |
| 2004/0052216 A1 | 3/2004 | Roh | |
| 2004/0068334 A1 | 4/2004 | Tsai et al. | |
| 2004/0071157 A1* | 4/2004 | Feldman et al. | 370/463 |
| 2004/0083301 A1 | 4/2004 | Murase et al. | |
| 2004/0100486 A1 | 5/2004 | Flamini et al. | |
| 2004/0103340 A1 | 5/2004 | Sundareson et al. | |
| 2004/0139047 A1 | 7/2004 | Rechsteiner et al. | |
| 2004/0139462 A1* | 7/2004 | Hannuksela | H04N 19/895 |
| | | | 725/32 |
| 2004/0162845 A1 | 8/2004 | Kim et al. | |
| 2004/0162903 A1 | 8/2004 | Oh | |
| 2004/0172410 A1 | 9/2004 | Shimojima et al. | |
| 2004/0181545 A1* | 9/2004 | Deng | G11B 27/30 |
| 2004/0205830 A1 | 10/2004 | Kaneko | |
| 2004/0212640 A1 | 10/2004 | Mann et al. | |
| 2004/0216173 A1 | 10/2004 | Horoszowski et al. | |
| 2004/0236844 A1 | 11/2004 | Kocherlakota | |
| 2004/0255249 A1 | 12/2004 | Chang et al. | |
| 2005/0021398 A1 | 1/2005 | McCleskey et al. | |
| 2005/0027821 A1 | 2/2005 | Alexander et al. | |
| 2005/0038981 A1 | 2/2005 | Connor et al. | |
| 2005/0044058 A1 | 2/2005 | Matthews et al. | |
| 2005/0050462 A1 | 3/2005 | Whittle et al. | |
| 2005/0053356 A1 | 3/2005 | Mate et al. | |
| 2005/0055595 A1 | 3/2005 | Frazer et al. | |
| 2005/0060759 A1 | 3/2005 | Rowe et al. | |
| 2005/0097542 A1 | 5/2005 | Lee | |
| 2005/0114852 A1 | 5/2005 | Chen et al. | |
| 2005/0123058 A1* | 6/2005 | Greenbaum et al. | 375/240.28 |
| 2005/0132351 A1 | 6/2005 | Randall et al. | |
| 2005/0138560 A1 | 6/2005 | Lee et al. | |
| 2005/0169371 A1* | 8/2005 | Lee | H04N 19/105 |
| | | | 375/240.03 |
| 2005/0191041 A1* | 9/2005 | Braun et al. | 386/125 |
| 2005/0198584 A1 | 9/2005 | Matthews et al. | |
| 2005/0204046 A1* | 9/2005 | Watanabe | H04L 29/06 |
| | | | 709/228 |
| 2005/0216851 A1 | 9/2005 | Hull et al. | |
| 2005/0227621 A1 | 10/2005 | Katoh | |
| 2005/0229118 A1 | 10/2005 | Chiu et al. | |
| 2005/0246369 A1 | 11/2005 | Oreizy et al. | |
| 2005/0251833 A1 | 11/2005 | Schedivy | |
| 2005/0283791 A1 | 12/2005 | McCarthy et al. | |
| 2005/0283798 A1* | 12/2005 | Hunleth et al. | 725/37 |

(56) References Cited

U.S. PATENT DOCUMENTS

| | | | |
|---|---|---|---|
| 2005/0288999 A1 | 12/2005 | Lerner et al. | |
| 2006/0011371 A1 | 1/2006 | Fahey | |
| 2006/0031381 A1 | 2/2006 | Van Luijt et al. | |
| 2006/0050970 A1 | 3/2006 | Gunatilake | |
| 2006/0051055 A1 | 3/2006 | Ohkawa | |
| 2006/0078305 A1* | 4/2006 | Arora et al. | 386/96 |
| 2006/0095401 A1 | 5/2006 | Krikorian et al. | |
| 2006/0095471 A1 | 5/2006 | Krikorian et al. | |
| 2006/0095472 A1 | 5/2006 | Krikorian et al. | |
| 2006/0095942 A1 | 5/2006 | Van Beek | |
| 2006/0095943 A1 | 5/2006 | Demircin et al. | |
| 2006/0104266 A1* | 5/2006 | Pelletier | H03M 7/30 370/389 |
| 2006/0107226 A1 | 5/2006 | Matthews et al. | |
| 2006/0117371 A1 | 6/2006 | Margulis | |
| 2006/0143650 A1* | 6/2006 | Tanikawa | G06F 17/30787 725/38 |
| 2006/0146174 A1 | 7/2006 | Hagino | |
| 2006/0174021 A1* | 8/2006 | Osborne | H04L 65/608 709/230 |
| 2006/0280157 A1 | 12/2006 | Karaoguz et al. | |
| 2007/0003224 A1* | 1/2007 | Krikorian et al. | 386/95 |
| 2007/0005783 A1 | 1/2007 | Saint-Hillaire et al. | |
| 2007/0022328 A1 | 1/2007 | Tarra et al. | |
| 2007/0074115 A1 | 3/2007 | Patten et al. | |
| 2007/0074117 A1* | 3/2007 | Tian | H04N 5/262 715/726 |
| 2007/0076604 A1 | 4/2007 | Litwack | |
| 2007/0168543 A1* | 7/2007 | Krikorian et al. | 709/231 |
| 2007/0180485 A1 | 8/2007 | Dua | |
| 2007/0198532 A1* | 8/2007 | Krikorian et al. | 707/10 |
| 2007/0201746 A1* | 8/2007 | Kim | H04N 5/147 382/190 |
| 2007/0234213 A1* | 10/2007 | Krikorian et al. | 715/716 |
| 2007/0286596 A1 | 12/2007 | Lonn | |
| 2008/0019276 A1 | 1/2008 | Takatsuji et al. | |
| 2008/0037573 A1 | 2/2008 | Cohen | |
| 2008/0059533 A1* | 3/2008 | Krikorian | 707/104.1 |
| 2008/0095228 A1* | 4/2008 | Hannuksela et al. | 375/240.01 |
| 2008/0134267 A1 | 6/2008 | Moghe et al. | |
| 2008/0195744 A1 | 8/2008 | Bowra et al. | |
| 2008/0199150 A1 | 8/2008 | Candelore | |
| 2008/0232687 A1* | 9/2008 | Petersohn | G06F 17/30802 382/173 |
| 2008/0263621 A1* | 10/2008 | Austerlitz et al. | 725/139 |
| 2008/0294759 A1 | 11/2008 | Biswas et al. | |
| 2008/0307456 A1 | 12/2008 | Beetcher et al. | |
| 2008/0307462 A1 | 12/2008 | Beetcher et al. | |
| 2008/0307463 A1 | 12/2008 | Beetcher et al. | |
| 2009/0041117 A1* | 2/2009 | Hannuksela | 375/240.01 |
| 2009/0074380 A1 | 3/2009 | Boston et al. | |
| 2009/0079840 A1* | 3/2009 | Gandhi et al. | 348/222.1 |
| 2009/0080864 A1* | 3/2009 | Rajakarunanayake | H04N 5/76 386/200 |
| 2009/0097500 A1* | 4/2009 | Diab et al. | 370/464 |
| 2009/0102983 A1* | 4/2009 | Malone et al. | 348/734 |
| 2009/0103607 A1* | 4/2009 | Bajpai et al. | 375/240.02 |
| 2009/0109341 A1* | 4/2009 | Oguz et al. | 348/625 |
| 2009/0115845 A1* | 5/2009 | Walls | H04N 5/147 348/135 |
| 2009/0150406 A1* | 6/2009 | Giblin | 707/10 |
| 2009/0199248 A1 | 8/2009 | Ngo et al. | |
| 2009/0207316 A1* | 8/2009 | Cupal | G11B 27/28 348/700 |
| 2010/0050080 A1* | 2/2010 | Libert et al. | 715/716 |
| 2010/0050083 A1* | 2/2010 | Axen et al. | 715/726 |
| 2010/0070483 A1* | 3/2010 | Delgo et al. | 707/706 |
| 2010/0070925 A1* | 3/2010 | Einaudi et al. | 715/830 |
| 2010/0086022 A1* | 4/2010 | Hunleth et al. | 375/240.01 |
| 2010/0100915 A1 | 4/2010 | Krikorian et al. | |
| 2010/0166063 A1* | 7/2010 | Perlman et al. | 375/240.07 |
| 2010/0303439 A1* | 12/2010 | Doser et al. | 386/239 |
| 2011/0013882 A1* | 1/2011 | Kusunoki et al. | 386/241 |
| 2011/0093560 A1* | 4/2011 | Morris | 709/217 |
| 2011/0182561 A1* | 7/2011 | Bae | 386/248 |
| 2011/0221927 A1* | 9/2011 | Takagi | 348/222.1 |
| 2014/0002749 A1* | 1/2014 | Pora et al. | 348/725 |
| 2014/0007152 A1* | 1/2014 | Pora et al. | 725/18 |
| 2014/0267337 A1* | 9/2014 | Keohane et al. | 345/545 |
| 2014/0282690 A1* | 9/2014 | Keohane et al. | 725/32 |

FOREIGN PATENT DOCUMENTS

| | | |
|---|---|---|
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| JP | 2003046582 A | 2/2003 |
| JP | 2003114845 A | 4/2003 |
| JP | 2004015111 A | 1/2004 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 2006074110 A | 7/2006 |
| WO | 2007027891 A2 | 3/2007 |
| WO | 2007051156 A2 | 5/2007 |
| WO | 2007141555 A2 | 12/2007 |
| WO | 2007149466 A2 | 12/2007 |
| WO | 2008024723 A | 2/2008 |

OTHER PUBLICATIONS

International Search Report for International Application No. PCT/US2007/063599, mailed Dec. 12, 2007.

International Search Report for International Application No. PCT/US2007/076337, mailed Oct. 20, 2008.

International Search Report and Written Opinion for International Application No. PCT/US2006/025912, mailed Jul. 17, 2008.

International Search Report for International Application No. PCT/US2008/059613, mailed Jul. 21, 2008.

International Search Report and Written Opinion for International Application No. PCT/US2008/080910, mailed Feb. 16, 2009.

Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.

Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.

Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.

Sling Media Inc. "Slingbox User Guide" [Online] 2006, XP002512553; retrieved from the Internet: <URL:http://www.slingmedia.hk/attach/en-US_Slingbox_User_Guide_v.12.pdf>; retrieved on Jan. 29, 2009.

Sony Corporation "LocationFree TV" [Online], 2004, SP002512410; retrieved from the Internet: <URL:http://www.docs.sony.com/release/LFX1_X5revision.pdf>, retrieved on Jan. 28, 2009 [note—document uploaded in two parts as file exceeds the 25MB size limit].

Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.

(56) References Cited

OTHER PUBLICATIONS

Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affilliate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed via a Personal Media Broadcaster," U.S. Appl. No. 12/334,959, filed Dec. 15, 2008.
Kulkarni, Anant Madhava "Systems and Methods for Creating Logical Media Streams for Media Storage and Playback," U.S. Appl. No. 12/323,907, filed Nov. 26, 2008.
Rao, Padmanabha R. "Systems and Methods for Linking Media Content," U.S. Appl. No. 12/359,784, filed Jan. 26, 2009.
Krikorian, Blake Gary et al. "Systems and Methods for Presenting Media Content Obtained From Multiple Sources," U.S. Appl. No. 12/408,456, filed Mar. 20, 2009.
Krikorian, Blake Gary et al. "Systems and Methods for Projecting Images From a Computer System," U.S. Appl. No. 12/408,460, filed Mar. 20, 2009.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Lucas, Brian et al. "Systems and Methods for Establishing Connections Between Devices Communicating Over a Network," U.S. Appl. No. 12/426,103, filed Apr. 17, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Conway, Frank et al. "Systems and Methods for Creating Variable Length Clips from a Media Stream," U.S. Appl. No. 12/347,465, filed Dec. 31, 2008.
USPTO, Final Office Action, mailed Nov. 6, 2009; U.S. Appl. No. 09/809,868, filed Mar. 15, 2001.
USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
USPTO, Non-Final Office Action mailed Oct. 1, 2009; U.S. Appl. No. 11/778,287, filed Jul. 16, 2007.
USPTO Final Office Action mailed Dec. 30, 2009; U.S. Appl. No. 11/147,664, filed Jun. 7, 2005.
European Patent Office, European Search Report, mailed Sep. 28, 2009 for European Application No. EP 06 78 6175.
International Search Report for PCT/US2008/069914 mailed Dec. 19, 2008.
PCT Partial International Search, PCT/US2009/054893, mailed Dec. 23, 2009.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact

(56) References Cited

OTHER PUBLICATIONS

With Programming," http://web.archive.org/web/20000815052751/ http://www.myreplaytv.com/, Aug. 15, 2000.

Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.

Srisuresh, P. et al. "Traditional IP Network Address Translator (Traditional NAT)," Network Working Group, The Internet Society, Jan. 2001.

Asnis, Ilya et al. "Mediated Network address Translation Traversal" U.S. Appl. No. 12/405,039, filed Mar. 16, 2009.

Thiyagarajan, Venkatesan et al. "Always-On-Top Media Player Launched From a Web Browser," U.S. Appl. No. 12/617,271, filed Nov. 12, 2009.

Paul, John Michael et al. "Systems and Methods for Delivering Messages Over a Network," U.S. Appl. No. 12/619,192, filed Nov. 16, 2009.

Rao, Padmanabha R. et al. "Methods and Apparatus for Establishing Network Connections Using an Inter-Mediating Device," U.S. Appl. No. 12/642,368, filed Dec. 18, 2009.

Dham, Vikram et al. "Systems and Methods for Establishing Network Connections Using Local Mediation Services," U.S. Appl. No. 12/644,918, filed Dec. 22, 2009.

Paul, John et al. "Systems and Methods for Remotely Controlling Media Server via a Network," U.S. Appl. No. 12/645,870, filed Dec. 23, 2009.

Bajpal, Parimal et al. "Method and Node for Transmitting Data Over a Communication Network using Negative Ackhowledgement," U.S. Appl. No. 12/404,920, filed Mar. 16, 2009.

Bajpal, Parimal et al. "Method and Note for Employing Network connections Over a Connectinoless Transport Layer Protocol," U.S. Appl. No. 12/405,062, filed Mar. 16, 2009.

China State Intellectual Property Office "Office Action" issued Mar. 18, 2010 for Application No. 200680022520.6.

China State Intellectual Property Office "Office Action" issued Apr. 13, 2010 for Application No. 200580026825.X.

Canadian Intellectual Property Office "Office Action" mailed Feb. 18, 2010 for Application No. 2569610.

European Patent Office "European Search Report," mailed May 7, 2010 for Application No. 06786174.0.

Margulis, Neal "Apparatus and Method for Effectively Implementing a Wireless Television System," U.S. Appl. No. 12/758,193, filed Apr. 12, 2010.

Margulis, Neal "Apparatus and Method for Effectively Implementing a Wireless Television System," U.S. Appl. No. 12/758,194, filed Apr. 12, 2010.

Margulis, Neal "Apparatus and Method for Effectively Implementing a Wireless Television System," U.S. Appl. No. 12/758,196, filed Apr. 12, 2010.

Kirkorian, Jason Gary et al. "Personal Media Broadcasting System with Output Buffer," U.S. Appl. No. 12/757,697, filed Apr. 9, 2010.

Tarra, Raghuveer et al. "Firmware Update for Consumer Electronic Device," U.S. Appl. No. 12/757,714, filed Apr. 9, 2010.

European Patent Office, European Search Report for European Application No. EP 08 16 7880, mailed Mar. 4, 2009.

MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.

International Searching Authority, Written Opinion and International Search Report for International Application No. PCT/US2008/077733, mailed Mar. 18, 2009.

International Searching Authority, Written Opinion and International Search Report for International Application No. PCT/US2008/087005, mailed Mar. 20, 2009.

Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.

Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.

Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.

Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [052], figures 1,2.

USPTO, Non-Final Office Action mailed Dec. 17, 2004; U.S. Appl. No. 09/809,868, filed Mar. 15, 2001.

USPTO, Final Office Action mailed Jul. 28, 2005; U.S. Appl. No. 09/809,868, filed Mar. 15, 2001.

USPTO, Non-Final Office Action mailed Jan. 30, 2006; U.S. Appl. No. 09/809,868, filed Mar. 15, 2001.

USPTO, Final Office Action mailed Aug. 10, 2006; U.S. Appl. No. 09/809,868, filed Mar. 15, 2001.

USPTO, Non-Final Office Action mailed Jun. 19, 2007; U.S. Appl. No. 09/809,868, filed Mar. 15, 2001.

USPTO, Non-Final Office Action mailed Apr. 16, 2008; U.S. Appl. No. 09/809,868, filed Mar. 15, 2001.

USPTO, Final Office Action mailed Sep. 18, 2008; U.S. Appl. No. 09/809,868, filed Mar. 15, 2001.

USPTO, Non-Final Office Action mailed Mar. 31, 2009; U.S. Appl. No. 09/809,868, filed Mar. 15, 2001.

USPTO, Non-Final Office Action mailed May 1, 2008; U.S. Appl. No. 11/111,265, filed Apr. 21, 2005.

USPTO, Final Office Action mailed Dec. 29, 2008; U.S. Appl. No. 11/111,265, filed Apr. 21, 2005.

USPTO, Non-Final Office Action mailed Jun. 8, 2009; U.S. Appl. No. 11/111,265, filed Apr. 21, 2005.

USPTO, Non-Final Office Action mailed Jun. 26, 2008; U.S. Appl. No. 11/620,707, filed Jan. 7, 2007.

USPTO, Final Office Action mailed Oct. 21, 2008; U.S. Appl. No. 11/620,707, filed Jan. 7, 2007.

USPTO, Non-Final Office Action mailed Mar. 25, 2009; U.S. Appl. No. 11/620,707, filed Jan. 7, 2007.

USPTO, Non-Final Office Action mailed Aug. 7, 2008; U.S. Appl. No. 11/620,711, filed Jan. 7, 2007.

USPTO, Final Office Action mailed Feb. 9, 2009; U.S. Appl. No. 11/620,711, filed Jan. 7, 2007.

USPTO, Non-Final Office Action mailed Feb. 25, 2009; U.S. Appl. No. 11/683,862, filed Mar. 8, 2007.

USPTO, Non-Final Office Action mailed Dec. 24, 2008; U.S. Appl. No. 11/147,985, filed Jun. 7, 2005.

USPTO, Non-Final Office Action mailed Jun. 25, 2008; U.S. Appl. No. 11/428,254, filed Jun. 30, 2006.

USPTO, Final Office Action mailed Feb. 6, 2009; U.S. Appl. No. 11/428,254, filed Jun. 30, 2006.

USPTO, Non-Final Office Action mailed May 15, 2009; U.S. Appl. No. 11/147,664, filed Jun. 7, 2005.

Sonic Blue "ReplayTV 5000 User's Guide," 2002, entire document.

Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.

Microsoft Corporation; Harman/Kardon "Master Your Universe" 1999.

Matsushita Electric Corporation of America MicroCast : Wireless PC Multimedia Transceiver System, Nov. 1998.

"Wireless Local Area Networks: Issues in Technology and Standards" Jan. 6, 1999.

USPTO, Final Office Action mailed Jun. 25, 2009; U.S. Appl. No. 11/147,985, filed Jun. 7, 2005.

China State Intellectual Property Office "First Office Action," issued Jan. 8, 2010, for Application No. 200810126554.0.

(56) References Cited

OTHER PUBLICATIONS

USPTO Final Office action mailed Jan. 25, 2010; U.S. Appl. No. 11/734,277, filed Apr. 12, 2007.
Australian Government "Office Action," Australian Patent Application No. 2006240518, mailed Nov. 12, 2009.
Jain, Vikal Kumar "Systems and Methods for Coordinating Data Communication Between Two Device," U.S. Appl. No. 12/699,280, filed Feb. 3, 2010.
Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
Newton's Telcom Dictionary, 20th ed., Mar. 2004.
"The Authoritative Dictionary of IEEE Standard Terms," 7th ed. 2000.
Gurzhi, Alexander et al. "Systems and Methods for Emulation Network-Enabled Media Components," U.S. Appl. No. 12/711,830, filed Feb. 24, 2010.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
Japan Patent Office "Notice of Grounds for Rejection (Office Action)," mailed May 25, 2010; Patent Application No. 2007-0268269.
Japan Patent Office "Notice of Grounds for Rejection (Office Action)," mailed May 25, 2010; Patent Application No. 2007-527683.
European Patent Office, International Searching Authority, "International Search Report," mailed Mar. 30, 2010; International Application PCT/US2009/068468 filed Dec. 27, 2009.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.

* cited by examiner

METHODS AND APPARATUS FOR SEEKING WITHIN A MEDIA STREAM USING SCENE DETECTION

TECHNICAL FIELD

The present disclosure generally relates to user interfaces used in connection with streamed media, and more particularly relates to methods and apparatus for seeking for a particular scene or time within streamed media.

BACKGROUND

Recently, consumers have expressed significant interest in "place shifting" devices that allow viewing of television or other media content at locations other than their primary television set. Place shifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

In the context of media streaming, including for example conventional general purpose computers running software for streaming placeshifted media, it is desirable to allow a user to seek within the media time buffer to find a particular scene or time slot, and then continue viewing the media from that point. The user interface for such a seeking operation typically allows a user to move (or "scrub") an icon such as a play-head icon across a visual representation of a timeline associated with the media. In response, the software then goes to the nearest keyframe, decodes and drops all frames until it reaches the desired position (i.e., time), and displays the correct frame.

Such a system is undesirable in a number of respects. For example, as the user's sole input is through a linear time display, it is often difficult to find a particular scene or transition within the media. That is, it is often the case that a user is far more interested in finding a particular favorite scene within a media stream than a particular discrete time within that stream. Furthermore, with a standard linear scrubber interface, the user is typically not given immediate feedback while scrubbing the icon along the timeline, and the resulting user interface lacks responsiveness.

It is therefore desirable to create systems and methods for seeking within streamed media in a way that is responsive, intuitive, and provides useful scene or scene transition information to the user. These and other desirable features and characteristics will become apparent from the subsequent detailed description and the appended claims, taken in conjunction with the accompanying drawings and this background section.

BRIEF SUMMARY

According to various exemplary embodiments, systems and methods are described for using generated scene transition frames to allow fast seeking within a media stream. A method of viewing a media stream in accordance with one embodiment includes: receiving a set of scene transition frames and a media stream from a remotely located media source over the network; displaying a subset of the scene transition frames; allowing a user to select a desired scene transition frame from the subset of the scene transition frames based on user input; and displaying the media source starting from a frame corresponding to the desired scene transition frame.

A media player system for viewing a media stream received from a remotely located media source over a network includes a memory for storing a set of scene transition frames associated with the media stream, a user interface configured to display a subset of the scene transition frames and receive user input indicating a selected scene transition frame, and a display for displaying for displaying the media source starting from a frame corresponding to the selected scene transition frame.

A method of providing media stream scene information in accordance with another embodiment includes receiving the media stream, generating (e.g., in real-time) a plurality of scene transition frames associated with the media stream; and transmitting the plurality of scene transition frames and the media stream substantially contemporaneously over a network.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary media encoding system;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Figure 1:
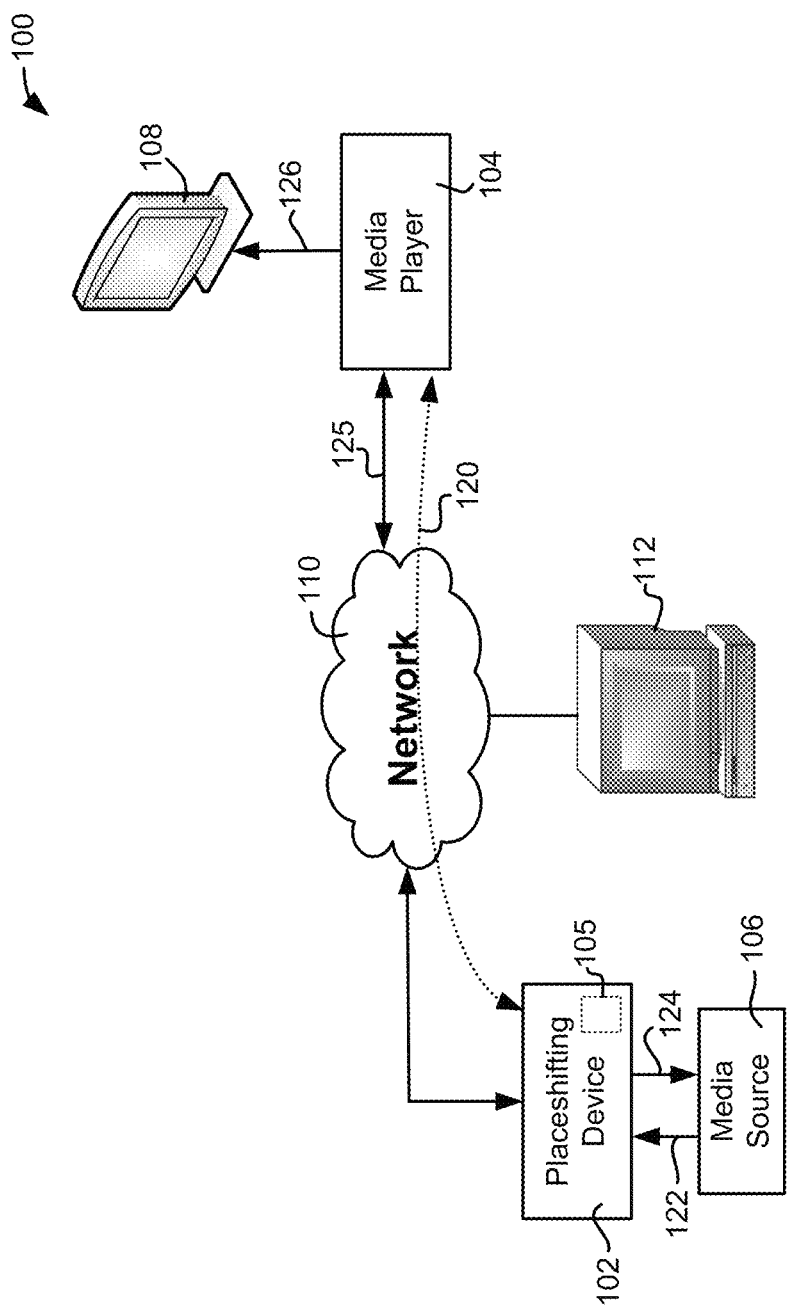

Turning now to the drawing figures and with initial reference to FIG. 1, an exemplary placeshifting system 100 suitably includes a placeshifting encoder system 102 that receives media content 122 from a content source 106, encodes the received content into a streaming format, and then transmits the encoded media stream 120 to a media player 104 over network 110. The media player 104 suitably receives the encoded stream 120, decodes the stream, and presents the decoded content to a viewer on a television or other display 108. In various embodiments, a server 112 may also be provided to communicate with encoder system 102 and/or player 104 via network 110 to assist these devices in locating each other, maintaining security, providing or receiving content or information, and/or any other features as desired. This feature is not required in all embodiments, however, and the concepts described herein may be deployed in any data streaming application or environment, including placeshifting but also any other media or other data streaming situation.

Placeshifting encoder system 102 is any component, hardware, software logic and/or the like capable of transmitting a packetized stream of media content over network 110. In various embodiments, placeshifting device 102 incorporates suitable encoder and/or transcoder (collectively "encoder") logic to convert audio/video or other media data 122 into a packetized format that can be transmitted over network 110. The media data 122 may be received in any format, and may be received from any internal or external source 106 such as any sort of broadcast, cable or satellite television programming source, a "video-on-demand" or similar source, a digital video disk (DVD) or other removable media, a video camera, and/or the like. Encoder system 102 encodes media data 122 to create media stream 120 in any manner. In various embodiments, encoder system 102 contains a transmit buffer 105 that temporarily stores encoded data prior to transmission on network 110. As buffer 105 fills or empties, one or more parameters of the encoding (e.g., the bit rate of media stream 120) may be adjusted to maintain desirable picture quality and data throughput in view of the then-current network performance. As described more fully below, various embodiments are able to calculate a current encoding rate and a current network transfer rate, and are able to adjust the encoding rate as the network transfer rate changes. Changes in the network transfer rate may be identified from, for example, changes in the utilization of the outgoing buffer 105.

Several examples of encoding systems 102 may be implemented using any of the various SLINGBOX products available from Sling Media of Foster City, Calif., although other products could be used in other embodiments. Many different types of encoder systems 102 are generally capable of receiving media content 122 from an external source 106 such as any sort of digital video recorder (DVR), set top box (STB), cable or satellite programming source, DVD player, and/or the like. In such embodiments, encoder system 102 may additionally provide commands 124 to the source 106 to produce desired signals 122. Such commands 124 may be provided over any sort of wired or wireless interface, such as an infrared or other wireless transmitter that emulates remote control commands receivable by the source 106. Other embodiments, however, particularly those that do not involve placeshifting, may modify or omit this feature entirely.

In other embodiments, encoder system 102 may be integrated with any sort of content receiving or other capabilities typically affiliated with source 106. Encoder system 102 may be a hybrid STB or other receiver, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed and/or place shifted to a remote player 104 as appropriate. Such devices 102 may also include a content database stored on a hard disk drive, memory, or other storage medium to support a personal or digital video recorder (DVR) feature or other content library as appropriate. Hence, in some embodiments, source 106 and encoder system 102 may be physically and/or logically contained within a common component, housing or chassis.

In still other embodiments, encoder system 102 is a software program, applet or the like executing on a conventional computing system (e.g., a personal computer). In such embodiments, encoder system 102 may encode, for example, some or all of a screen display typically provided to a user of the computing system for placeshifting to a remote location. One device capable of providing such functionality is the SlingProjector product available from Sling Media of Foster City, Calif., which executes on a conventional personal computer, although other products could be used as well.

Media player 104 is any device, component, module, hardware, software and/or the like capable of receiving a media stream 120 from one or more encoder systems 102. In various embodiments, remote player 104 is personal computer (e.g., a "laptop" or similarly portable computer, although desktop-type computers could also be used), a mobile phone, a personal digital assistant, a personal media player (such as the ARCHOS products available from the Archos company of Igny, France) or the like. In many embodiments, remote player 104 is a general purpose computing device that includes a media player application in software or firmware that is capable of securely connecting to placeshifting encoder system 102, as described more fully below, and of receiving and presenting media content to the user of the device as appropriate. In other embodiments, however, media player 104 is a standalone or other separate hardware device capable of receiving the media stream 120 via any portion of network 110 and decoding the media stream 120 to provide an output signal 126 that is presented on a television or other display 108. One example of a standalone media receiver 104 is the SLINGCATCHER product available from Sling Media of Foster City, Calif., although other products could be equivalently used.

Network 110 is any digital or other communications network capable of transmitting messages between senders (e.g., encoder system 102) and receivers (e.g., receiver 104). In various embodiments, network 110 includes any number of public or private data connections, links or networks supporting any number of communications protocols. Network 110 may include the Internet, for example, or any other network based upon TCP/IP or other conventional protocols. In various embodiments, network 110 also incorporates a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks.

Encoder system 102 and/or player 104 are therefore able to communicate with player 104 in any manner (e.g., using any sort of data connections 128 and/or 125, respectively). Such communication may take place over a wide area link that includes the Internet and/or a telephone network, for example; in other embodiments, communications between devices 102 and 104 may take place over one or more wired or wireless local area links that are conceptually incorporated within network 110. In various equivalent embodiments, encoder system 102 and receiver 104 may be directly connected via any sort of cable (e.g., an Ethernet cable or the like) with little or no other network functionality provided.

Many different placeshifting scenarios could be formulated based upon available computing and communications resources, consumer demand and/or any other factors. In various embodiments, consumers may wish to placeshift content within a home, office or other structure, such as from a placeshifting encoder system 102 to a desktop or portable computer located in another room. In such embodiments, the content stream will typically be provided over a wired or wireless local area network operating within the structure. In other embodiments, consumers may wish to placeshift content over a broadband or similar network connection from a primary location to a computer or other remote player 104 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE or CDMA/EVDO connection, any sort of 3G or subsequent telephone link, an IEEE 802.11 "Wi-fi" link, and/or the like). Several examples of placeshifting applications available for various platforms are provided by Sling Media of Foster City, Calif., although the concepts described herein could be used in conjunction with products and services available from any source.

Encoder system 102, then, generally creates a media stream 120 that is routable on network 110 based upon content 122 received from media source 106. To that end, and with reference now to FIG. 2, encoder system 102 typically includes an encoder module 202, a buffer 105 and a network interface 206 in conjunction with appropriate control logic 205. In operation, encoder module 202 typically receives media content 122 from an internal or external source 106, encodes the data into the desired format for media stream 120, and stores the encoded data in buffer 105. Network interface 206 then retrieves the formatted data from buffer 105 for transmission on network 110. Control module 205 suitably monitors and controls the encoding and network transmit processes carried out by encoding module 202 and network interface 206, respectively, and may perform other features as well. Encoder system 102 may also have a module 208 or other feature capable of generating and providing commands 124 to an external media source 106, as described above.

Figure 2:
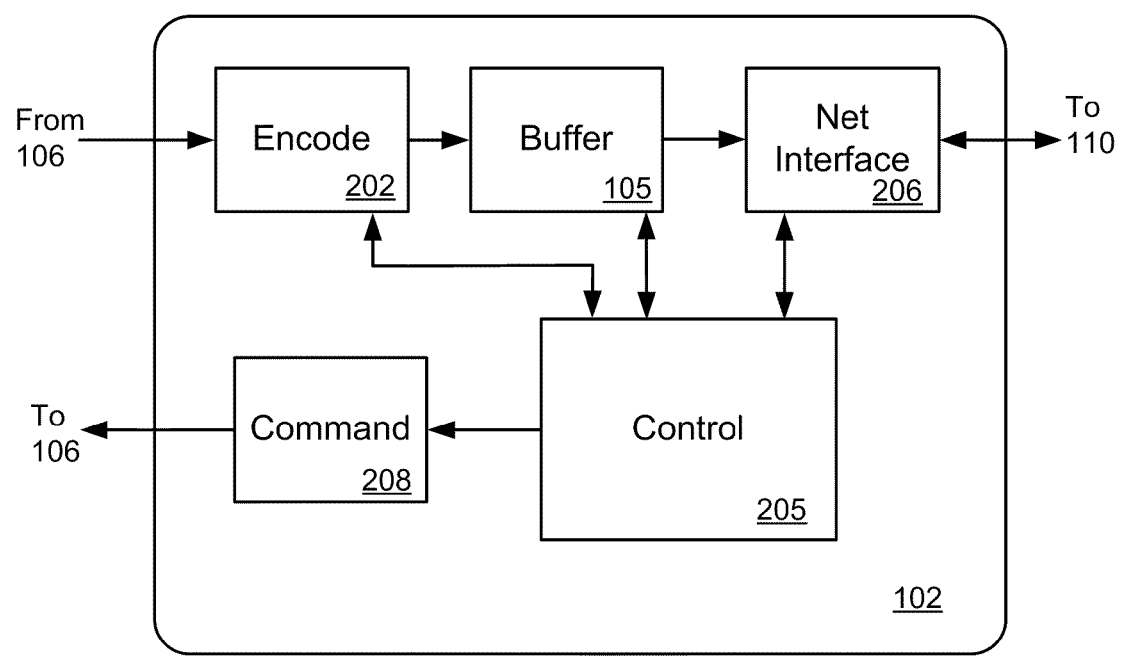
FIG. 2 is a block diagram of an exemplary media encoding device.

In the exemplary embodiment shown in FIG. 2, modules 202, 105, 205, 206 and 208 may be implemented in software or firmware residing in any memory, mass storage or other storage medium within encoder system 102 in source code, object code and/or any other format. Such features may be executed on any sort of processor or microcontroller executing within encoder system 102. In various embodiments, encoder system 102 is implemented as a system on a chip (SoC) type system with integrated processing, storage and input/output features. Various SoC hardware implementations are available from Texas Instruments, Conexant Systems, Broadcom Inc., and other suppliers as appropriate. Other embodiments may use any number of discrete and/or integrated processing components, memories, input/output features and/or other features as desired.

As noted above, creating a media stream 120 typically involves encoding and/or transcoding an input media stream 122 received from an internal or external media source 106 into a suitable digital format that can be transmitted on network 110. Generally, the media stream 120 is placed into a standard or other known format (e.g., the WINDOWS MEDIA format available from the Microsoft Corporation of Redmond, Wash. although other formats such as the QUICKTIME format, REALPLAYER format, MPEG format, and/or the like could be used in any other embodiments) that can be transmitted on network 110. This encoding may take place, for example, in any sort of encoding module 202 as appropriate. Encoding module 202 may be any sort of hardware (e.g., a digital signal processor or other integrated circuit used for media encoding), software (e.g., software or firmware programming used for media encoding that executes on the SoC or other processor described above), or the like. Encoding module 202 is therefore any feature that receives media data 122 from the internal or external source 106 (e.g., via any sort of hardware and/or software interface) and encodes or transcodes the received data into the desired format for transmission on network 110. Although FIG. 2 shows a single encoding module 202, in practice system 102 may include any number of encoding modules 202. Different encoding modules 202 may be selected based upon preference of player 104, network conditions, and/or the like.

In various embodiments, encoder 202 may also apply other modifications, transforms and/or filters to the received content before or during the transcoding process. Video signals, for example, may be resized, cropped and/or skewed. Similarly, the color, hue and/or saturation of the signal may be altered, and/or noise reduction or other filtering may be applied. Audio signals may be modified by adjusting volume, sampling rate, mono/stereo parameters, noise reduction, multi-channel sound parameters and/or the like. Digital rights management encoding and/or decoding may also be applied in some embodiments, and/or other features may be applied as desired.

In various embodiment, including those in which media is streamed to media player 104 that comprises a general purpose computer running a media application, a set of scene transition frames are generated and transmitted to media player 104 (e.g., by placeshifting device 102, out-of-band) such that a user may easily search for a particular scene within the media stream.

Figure 3:
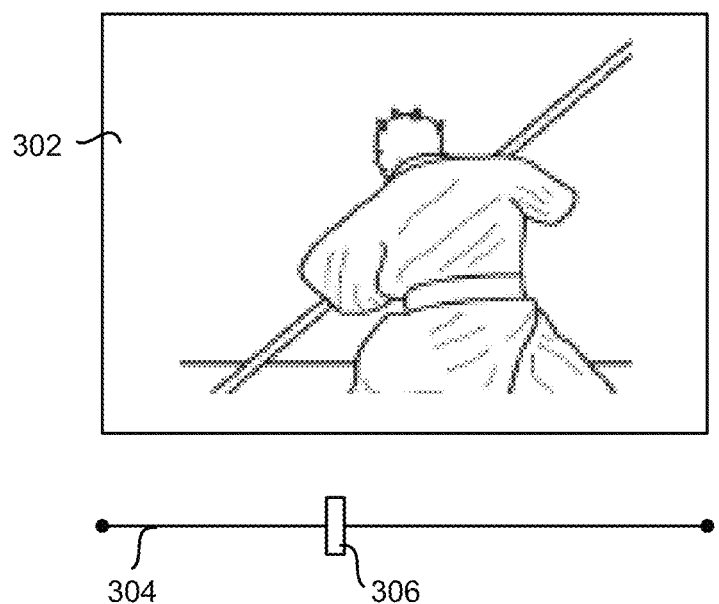
FIG. 3 is a conceptual overview of a typical time line user interface used in connection with a media buffer.

As a preliminary matter, FIG. 3 shows a simplified view of a typical user interface used to seek within a time shift buffer. In general, a timeline 304 is presented to the user such that its geometry corresponds to the extent of the media being viewed, while the buffer will typically include a subset of the total media that will ultimately be streamed. In this embodiment, for example, timeline 304 is literally a line segment whose endpoints correspond to the beginning and end of the media. To visualize the current location within the stream, an icon 306 (e.g., a rectangular icon as shown) is displayed along timeline 304 at the location that proportionally corresponds to the position of viewed media within window 302. By moving icon 306 back and forth along timeline 304 (to the extent allowed by the buffered information, the user is able to select a particular scene or time within the buffer and begin watching the displayed media 302 at that point. As will be appreciated, it can be difficult to find a particular scene or scene transition (e.g., the point at which a program resumes after a commercial) using a simple linear scrubber interface as illustrated.

In accordance with the present invention, however, a set of scene transition frames are displayed and transmitted along with the media stream. These frames can then be used in connection with a user interface (e.g., as a real-time "storyboard") to allow the viewer to easily select a desired scene within the media stream.

Figure 4:
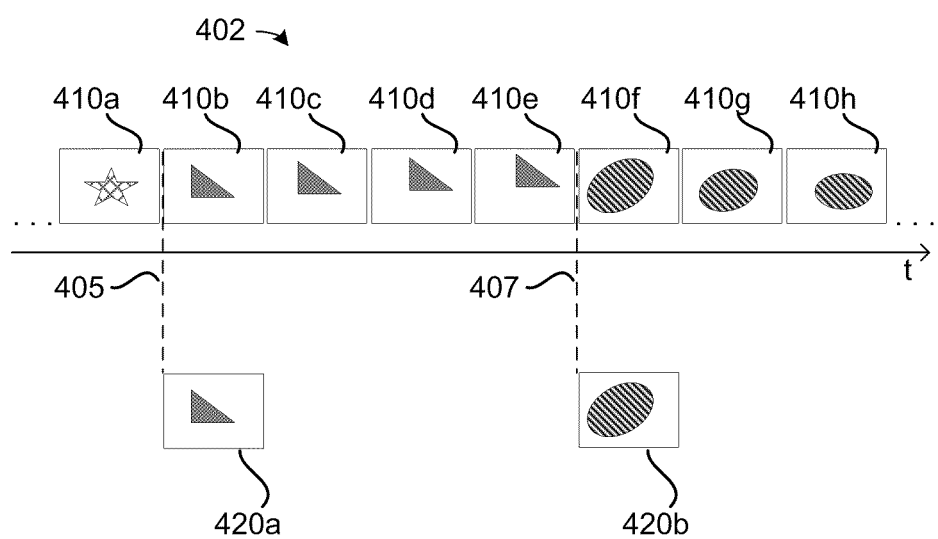
FIG. 4 depicts, conceptually, the generation of scene transition frames in accordance with one embodiment.

Referring now to FIG. 4, a media stream 402 can be visualized conceptually as a series of time-wise sequential frames 410 (e.g., 410a-410h), which may have a variety of formats as is known in the art. In this illustration, the various geometric forms within frames 410 are used to depict exemplary content of the frame images as the scenes progress. In general, a subset of scenes 410 will be keyframes placed at regular intervals.

In accordance with the one aspect, a set of scene transition frames 420 are generated by performing substantially real-time analysis of media stream 402. That is, a typical media stream—particularly narrative video works such as TV programs, movies, and the like—will include content made up of a series of scenes. These scenes are generally characterized by more or less contiguous movement, dialog, viewpoint, and/or physical settings.

The system (e.g., placeshifting device 102), suitably examines stream 410 to determine when such scene transitions occur. In the simplified stream 402 shown in FIG. 4, for example, there is a transition from frame 410a to 410b (from a star shape to a triangle shape), and a transition from frame 410e to 410f (from a triangle shape to an ellipse). Stated another way, scene transition frame 420a comprises the first frame after a transition time 405, and scene transition frame 420b comprises the first frame after a transition time 407.

An individual will intuitively regard frames 410b-410e as a single "scene," notwithstanding the fact that the frames are not identical, because their content is sufficiently contiguous over time (i.e., a triangle translating diagonally within the frame). Similarly, frames 410f-410h are sufficiently contiguous in terms of the rotation and translation of an ellipse over time.

Likewise, the system (e.g., through any suitable combination of hardware and software), attempts to similarly determine scene transitions 405 and 407 via one or more image processing algorithms. That is, the system generates the set of scene transition frames 420 by examining adjacent frames 410 for image content change that is greater than a predetermined threshold or other metric.

Various attributes of image content for frames 410 may be analyzed and compared, including, for example, color, shape, brightness, contrast, hue, saturation, detected edges and any other attribute that can assist in determining scene transitions.

In one embodiment, generation of scene transition frames 420 is performed by placeshifting device 102, and those frames are subsequently sent to media player 104 over network 110 (FIG. 1), where they are stored in a suitable memory or storage medium. Scene transition frames 420 may be sent within the signal used for the media stream itself, but is preferably sent "out-of-band" with respect to the media stream. In this way, media player 104 may consider the two streams of information in parallel. In one embodiment, however, all key frames are cached. This allows, for example, placeshifting device 102 to mark particular key frames (e.g., in-band) as "scene change" frames using conventional techniques, instead of sending a large number of frames out-of-band.

In the interest of providing a responsive and timely user interface, the scene transition frames 410 may be sent substantially contemporaneously with the media stream. This allows the user to select frames in near real time as the media accumulates within media player 104.

Figure 5:
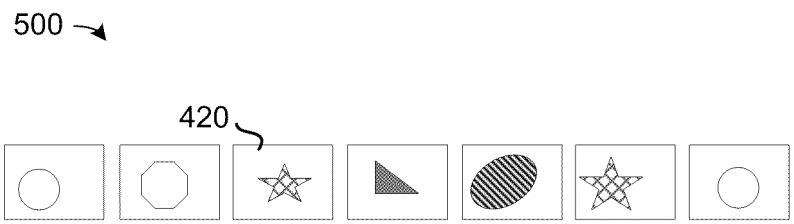
FIGS. 5 and 6 depict, conceptually, exemplary user interfaces for allowing a user to select a desired scene transition frames.
Figure 6:
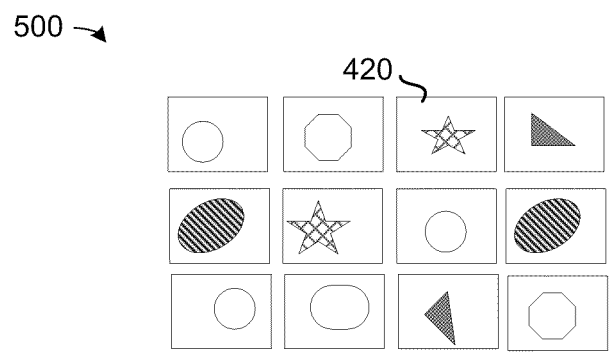

In this regard, referring now to FIGS. 5 and 6, the received scene transition frames 420 may be presented to the user in a number of different ways, depending upon the desired user interface 500. In FIG. 5, for example, a subset of the scene transition frames 420 available to the player is depicted as a one-dimensional sequence of thumbnails. Suitable navigation icons (not shown) may be provided for navigating through the entire set. The number and size of thumbnails used for scene transition frames 420 may be selected depending upon screen size, processing power, and any other relevant characteristics of the system.

In a second embodiment, shown in FIG. 6, a two-dimensional array of thumbnails is presented to the user. As with FIG. 5, various additional user interface elements may be provided for "zooming out" or otherwise allowing a more macro view of the available scene transition frames 420.

Regardless of how the subset of frames 420 is displayed, the user is allowed to select a desired scene transition frame 420 using any convenient mode of user interaction, including conventional keyboard and mouse selection techniques. Once the desired scene transition frame 420 is selected, the media player 104 then jumps to that frame (and point of time) within the media stream, and continues playing or otherwise displaying the media stream for the user.

It will be apparent that the various methods and systems described above are advantageous in that, among other things, a user can easily find and select a particular scene by directly selecting it from a storyboard, rather than by roughly traversing a linear user interface and finding the scene through trial and error.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method of providing a media stream from a placeshifting device to a remotely-located media player via a network, the method comprising:

receiving a media stream of live content by the placeshifting device in a first format;

while the placeshifting device is continuously receiving the media stream of the live content, the placeshifting device transcoding the media stream of the live content from the first format to a second format having at least one parameter suited to then-current network conditions between the placeshifting device and the media player;

while transcoding the media stream of the live content, the placeshifting device performing a substantially real-time analysis of the media stream to generate a plurality of scene transition frames associated with the media stream; and while continuing to receive and transcode the media stream of the live content, the placeshifting device transmitting the plurality of scene transition frames generated by the real time analysis and the transcoded media stream in the second format substantially contemporaneously over the network to the remotely located media player to thereby allow the remotely-located media player to store and display the plurality of scene transition frames for viewing and subsequent selection and navigation of the media stream by a user of the remotely-located media player;

wherein the generation of the plurality of scene transition frames, the storing of the plurality of scene transition frames, the display of the plurality of scene transition frames and the selection of the desired scene transition frames are performed substantially contemporaneously with viewing of the media stream by the user; and wherein the media stream further includes a plurality of key frames, and the plurality of scene transition frames correspond to a marked subset of the key frames, wherein a number of marked scene transition frames is less than a number of key frames included in the media stream.

2. The method of claim 1, wherein the plurality of scene transition frames are received substantially contemporaneously with the media stream.

3. The method of claim 1 wherein the plurality of scene transition frames are displayed as a one-dimensional series of thumbnail images.

4. The method of claim 1, wherein the plurality of scene transition frames are displayed as a two-dimensional array of thumbnail images.

5. The method of claim 1, wherein the plurality of scene transition frames are generated by the placeshifting device examining adjacent frames for image content change that is greater than a predetermined threshold during transcoding of the media stream.

6. A placeshifting device to transmit a media stream of live content to a remotely-located media player via a network, the placeshifting device comprising a network interface to the network, a memory storing instructions, and a processor configured to execute the instructions, wherein the instructions, when executed, cause the placeshifting device to perform operations comprising:
   receiving the media stream of the live content in a first format via the network interface;
   while continuously receiving the media stream of the live content, transcoding the media stream of the live content from the first format to a second format having at least one parameter suited to then-current conditions of the network between the placeshifting device and the media player;
   while transcoding the media stream of the live content, performing a substantially real-time analysis of the media stream to generate a plurality of scene transition frames associated with the media stream; and
   while continuing to receive and transcode the media stream of the live content, transmitting the plurality of scene transition frames generated by the real time analysis and the transcoded media stream in the second format substantially contemporaneously over the network to the remotely located media player to thereby allow the remotely-located media player to store and display the plurality of scene transition frames for viewing and subsequent selection and navigation of the media stream by a user of the remotely-located media player;
   wherein the generation of the plurality of scene transition frames, the storing of the set plurality of scene transition frames, the display of the plurality of scene transition frames and the selection of the desired scene transition frames are performed substantially contemporaneously with viewing of the media stream by the user; and
   wherein the media stream further includes a plurality of key frames, and the plurality of scene transition frames correspond to a marked subset of the key frames, wherein a number of marked scene transition frames is less than a number of key frames included in the media stream.

7. The placeshifting device of claim 6 further comprising a buffer coupled to the network interface, wherein the then-current network conditions are indicated by a utilization of the buffer.

8. The placeshifting device of claim 7 wherein the at least one parameter is a bit rate of the media stream.

9. The placeshifting device of claim 7 wherein the media stream is encoded from the first format to the second format as the media stream is received by the placeshifting device.

10. The placeshifting device of claim 9 wherein the media stream is a live television broadcast.

* * * * *